United States Patent
Rao et al.

(10) Patent No.: US 10,866,982 B2
(45) Date of Patent: Dec. 15, 2020

(54) INTELLIGENT CONTENT RECOMMENDER FOR GROUPS OF USERS

(71) Applicant: Accenture Global Solutions Limited, Dublin (IE)

(72) Inventors: Srikanth G. Rao, Bangalore (IN); Tarun Singhal, Bulandshahr (IN); Dongay Choudary Nuvvula, Bangalore (IN); Ranjana Bhalchandra Narawane, Mumbai (IN); Avishek Gulshan, Bangalore (IN); Gauri S. Chikodi, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 108 days.

(21) Appl. No.: 16/287,149

(22) Filed: Feb. 27, 2019

(65) Prior Publication Data

US 2019/0266185 A1    Aug. 29, 2019

(30) Foreign Application Priority Data

Feb. 27, 2018    (IN) .............................. 201811007401

(51) Int. Cl.
*G06F 7/00* (2006.01)
*G06F 16/435* (2019.01)
(Continued)

(52) U.S. Cl.
CPC ............ *G06F 16/435* (2019.01); *G06F 16/48* (2019.01); *H04N 21/4661* (2013.01); *H04N 21/4667* (2013.01)

(58) Field of Classification Search
CPC ... G06F 16/435; G06F 16/48; H04N 21/4661; H04N 21/4667
(Continued)

(56) References Cited

U.S. PATENT DOCUMENTS

| 8,468,164 B1 | 6/2013 | Paleja et al. |
| 8,706,503 B2 | 4/2014 | Cheyer et al. |

(Continued)

FOREIGN PATENT DOCUMENTS

| EP | 2628293 | 8/2013 |
| WO | WO2011/155827 | 12/2011 |
| WO | WO 2012/051555 | 4/2012 |

OTHER PUBLICATIONS

U.S. Appl. No. 12/905,014, filed Oct. 14, 2010, Ciancutti et al.
(Continued)

*Primary Examiner* — Isaac M Woo
(74) *Attorney, Agent, or Firm* — Fish & Richardson P.C.

(57) ABSTRACT

Methods and systems including computer programs encoded on a computer storage medium, for receiving a request for digital content to be provided from a plurality of items of digital content, determining a set of content scores for each item of digital content in the plurality of items of digital content, each content score in the set of content scores being specific to a user of the plurality of users, and a respective item of digital content, calculating a combined score deviation for each item of digital content based on a difference between a minimum content score and a maximum content score of the set of content scores of a respective item of digital content, determining at least one candidate item of digital content, the at least one candidate item of digital content having a lowest combined score deviation among combined score deviations of the plurality of items of digital content, and providing the at least one candidate item of digital content.

17 Claims, 5 Drawing Sheets

(51) Int. Cl.
*H04N 21/466* (2011.01)
*G06F 16/48* (2019.01)

(58) Field of Classification Search
USPC .................................................. 707/600–899
See application file for complete search history.

(56) References Cited

U.S. PATENT DOCUMENTS

| | | | |
|---|---|---|---|
| 9,318,108 | B2 | 4/2016 | Gruber et al. |
| 9,338,493 | B2 | 5/2016 | Van Os et al. |
| 2008/0243997 | A1 | 10/2008 | Bouzid et al. |
| 2010/0088265 | A1* | 4/2010 | Pohl ...................... G06Q 30/02 |
| | | | 706/46 |
| 2011/0093337 | A1 | 4/2011 | Granit et al. |
| 2012/0096013 | A1 | 4/2012 | Ciancutti et al. |
| 2012/0317492 | A1 | 12/2012 | Sheeder |
| 2013/0041976 | A1 | 2/2013 | Hendricks et al. |
| 2013/0080907 | A1 | 3/2013 | Skelton |
| 2014/0040274 | A1 | 2/2014 | Aravamudan |
| 2014/0279756 | A1 | 9/2014 | Whitman |
| 2016/0366458 | A1 | 12/2016 | Whitman |
| 2017/0004562 | A1 | 1/2017 | Dillon et al. |
| 2019/0050494 | A1 | 2/2019 | Rao et al. |

OTHER PUBLICATIONS

U.S. Appl. No. 15/487,061, filed Apr. 13, 2017, Ramnani et al.
"Everything You Need To Know About AI Assistants, From Siri To Ozlo," retrieved from <https://www.fastcompany.com/3059719/handicapping-the-ai-assistants-from-siri-to-ozlo>, May 17, 2016, 49 pages.
AU Office Action in Australian Application No. 2019201001, dated Jun. 14, 2019, 4 pages.
Bergamaschi, Sonia, Laura Po, and Serena Sorrentino. "Comparing Topic Models for a Movie Recommendation System." WEBIST (2). 2014, 12 pages.
Braina—Artificial Intelligence Software for Windows, retrieved on May 12, 2017, from <https://www.brainasoft.com/braina/>, 8 pages.
Chen, Li, and Pearl Pu. "Critiquing-based recommenders: survey and emerging trends." User Modeling and User-Adapted Interaction 22.1 (2012): 125-150.
European Search Report in European application No. 18184656.9, dated Nov. 6, 2018, 11 pages.
Gaurav Sharma "Bots, Chat, Voice, Zero UI, and the future of Mobile Apps," retrieved from <https://chatbotsmagazine.com/the-future-of-ui-bots-conversation-voice-zero-ui-and-the-end-of-the-mobile-apps-defa5dcc09f5>, Mar. 27, 2016, 18 pages.
Jessi Hempel, "Facebook Launches M, Its Bold Answer to Siri and Cortana" Business, retrieved from <https://www.wired.com/2015/08/facebook-launches-m-new-kind-virtual-assistant/>, Aug. 26, 2015, 8 pages.
John Brandon, "Google Pixel phone packs a powerful voice assistant, but it's no Alexa," retrieved from <http://www.computerworld.com/article/3132396/personal-technology/google-pixel-phone-packs-a-powerful-voice-assistant-but-it-s-no-alexa.html#tk.drr_mlt>, Oct. 18, 2016, 3 pages.
Linden, Greg, Steve Hanks, and Neal Lesh. "Interactive assessment of user preference models: The automated travel assistant." User Modeling: Proceedings of the Sixth International Conference, UM97, 1997, 12 pages.
Mike Elgan, "Why Google A.I. is the last user interface," retrieved from <http://www.computerworld.com/article/3129098/artificial-intelligence/why-google-a-i-is-the-last-user-interface.html>, Oct. 8, 2016, 7 pages.
Shabana Arora, "Recommendation Engines: How Amazon and Netflix Are Winning the Personalization Battle," retrieved from <https://www.martechadvisor.com/articles/customer-experience/recommendation-engines-how-amazon-and-netflix-are-winning-the-personalization-battle/>, Jun. 28, 2016, 6 pages.
IN Office Action in Indian Appln. No. 201811007401, dated Aug. 17, 2020, 9 pages.

* cited by examiner

INTELLIGENT CONTENT RECOMMENDER FOR GROUPS OF USERS

CROSS-REFERENCE TO RELATED APPLICATION

This application claims priority to Indian Patent Application No. 201811007401, filed on Feb. 27, 2018, entitled "Intelligent Content Recommender For Groups Of Users," the entirety of which is hereby incorporated by reference.

BACKGROUND

This specification generally relates to computer-based techniques for interactive content recommendation for selecting and providing customized content to users.

A user can have access to a large volume of digital content (e.g., media content) from various sources. Selection of a particular content item (e.g., movie, television program, music album, online books, streaming content, shopping) can be resource intensive (e.g., repetitive searching), and overwhelming without assistance. Content guidance can be provided in the form of saved selections (e.g., "continue watching your show?"), sorting by a content provider of content into various categories (e.g., "dramas," "comedies," "animated"), or other forms of streamlining a content selection process.

While predictive technology may incorporate historical user preferences to recommend content, it can fail to account for changes in user taste, and unpremeditated user choices. Further, recommending content for a group of users can be more sophisticated than for individual users. In addition, a user may have different interests as a member of a group than as an individual. For example, a user may be a fan of horror movies, but does not want to watch horror movies when with children.

SUMMARY

Implementations of the present disclosure are directed to computer-based interactive content recommendation for selecting and providing customized content to users. More particularly, implementations of the present disclosure are directed to computer-based interactive content recommendation for providing content items based on a plurality of users. Content items can include digital content. Example digital content can include media content, such as, but not limited to, movies, television shows, video clips, music content, games, interactive media, web-based content, virtual reality content, shopping items, trip arrangement, holiday planning, or other forms of consumable media content.

In some implementations, actions include receiving a request for digital content to be provided from a plurality of items of digital content, determining a set of content scores for each item of digital content in the plurality of items of digital content, each content score in the set of content scores being specific to a user of the plurality of users, and a respective item of digital content, calculating a combined score deviation for each item of digital content based on a difference between a minimum content score and a maximum content score of the set of content scores of a respective item of digital content, determining at least one candidate item of digital content, the at least one candidate item of digital content having a lowest combined score deviation among combined score deviations of the plurality of items of digital content, and providing the at least one candidate item of digital content. Other implementations of this aspect include corresponding systems, apparatus, and computer programs, configured to perform the actions of the methods, encoded on computer storage devices.

These and other implementations can each optionally include one or more of the following features: actions further include determining a combined persona for two or more users of the plurality of users based on a history of items of digital content previously provided to the two or more users, determining a combined persona score deviation for each item of digital content of the plurality of items of digital content, and filtering the plurality of items of digital content to provide one or more items of digital content that have a lowest combined persona score deviation among the plurality of items of digital content, wherein the at least one candidate item of digital content is one of the one or more items of digital content; the combined persona includes at least one content attribute for which the two or more users have previously provided feedback; a content score specific to a user is determined based on a history of user consumption of items of digital content; a content score specific to a user is determined based on feedback that the user has provided; the feedback is associated with one or more content attributes; the feedback includes a first feedback and a second feedback, the first feedback having a first weight in the content score and the second feedback having a second weight in the content score, the second weight being different from the first weight; actions further include receiving a selected candidate item of digital content that is selected from the at least one candidate item of digital content by a user of the plurality of users, and updating content scores of an item of digital content, wherein the item of digital content has at least one common content attribute with the selected candidate item of digital content; and the plurality of items of digital content include movies.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations among the various drawings indicate like elements.

DETAILED DESCRIPTION

Figure 1:
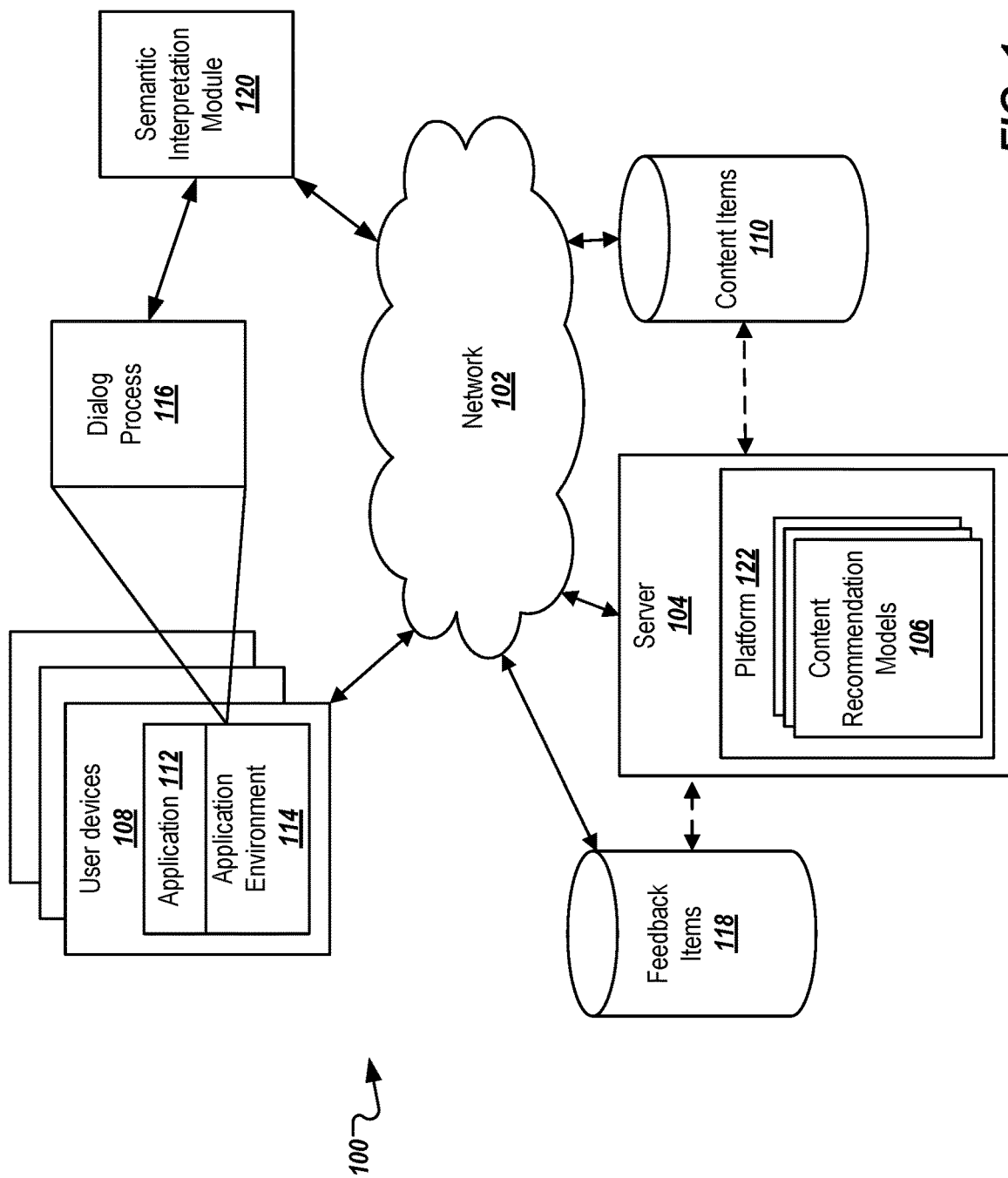
FIG. 1 is a block diagram of an example operating environment for content recommendation in accordance with implementations of the present disclosure.

Implementations of the present disclosure are directed to computer-based digital content recommendation for selecting and providing content items to users. More particularly, implementations of the present disclosure are directed to computer-based platforms and models for recommending digital contents to a group of two or more users. Content items can include digital content. Example digital content includes, without limitation, movies, television shows, video clips, music content, games, online e-books, interactive media, web-based streaming content, virtual reality content, shopping items, trip arrangements, holiday planning, or other forms of consumable media content.

In some implementations, actions include receiving a request for digital content to be provided from a plurality of items of digital content, determining a set of content scores for each item of digital content in the plurality of items of digital content, each content score in the set of content scores being specific to a user of the plurality of users, and a respective item of digital content, calculating a combined score deviation for each item of digital content based on a difference between a minimum content score and a maximum content score of the set of content scores of a respective item of digital content, determining at least one candidate item of digital content, the at least one candidate item of digital content having a lowest combined score deviation among combined score deviations of the plurality of items of digital content, and providing the at least one candidate item of digital content.

Traditionally, a recommendation system can recommend content based on a content consumption history, and/or demographics of a user who is submitting a request for content. However, when content is to be recommended for a group of users, interest and/or demographics of the submitting user may not represent the collective interest and/or demographics of the group. For example, the submitting user may be a fan of romantic movies, while the rest of the group view romantic movies as boring. Further, a user (e.g., the submitting user) may behave differently in a group of people than on their own. The user may even want to hide some of their habits or interests from particular people in the group. In some situations, a user may want to share different interests with different groups of people (e.g., political views, romantic interests). Thus, there is a need for technology to improve social experience of users by utilizing content recommendation based on a group of users, for whom the content is requested.

In view of this, implementations of the present disclosure provide a content recommendation platform (the "platform") to recommend content to a group of users that includes two or more users. In some implementations, a request (which can be referred to as a "group request") for content recommendation for a group of users is received. For each user in the group of users, a user consumption pattern is determined. Based on the user consumption pattern a predictive scoring model (PSM) provides a content score for each content item that could be recommended by the platform (e.g., is available for the platform to provide to users). A content score is determined per content item per user of the group of users. For each content item, a combined score deviation is determined based on the content scores of the users. The content items with the lowest combined score deviation are considered as candidate content items to be recommended to the group of users.

In some implementations, the content recommendation model (the "model") also includes a filter based on a joint consumption history of two or more users of the group. A joint consumption history of multiple users includes a history of content recommended to, consumed by, or for which feedback is provided (implicitly or explicitly) by the multiple users as one group. In some implementations, the content recommendation model provides one or more pattern filters for two or more users of the group. The pattern filters include the past combined consumption patterns of the two or more users (when considered as a group). The filter can also be based on social media activities, demographics, temporal preferences, and favorites (i.e., items determined as favorite) shared between the multiple users. The pattern filters can also be based on social media activities, demographics, temporal preferences, and favorites (i.e., items determined as favorite) shared between the users, and/or publicly. In some implementations, content items are filtered to provide the candidate content items. In this manner, if one or more users have a previous consumption pattern that indicates some preference, the preference can take priority irrespective of the combined score deviation FIG. 1 is a block diagram of an example operating environment 100 for content recommendation in accordance with implementations of the present disclosure. The example operating environment 100 includes a computer network 102, such as a local area network (LAN), the Internet, or a combination thereof, connecting a server computer 104, user devices 108, and a repository of content items 110.

The server computer 104 utilizes a content recommendation platform 122 and one or more content recommendation models 106. The server computer 104 (and the platform 102 and the models 106) are in communication with the repository of content items 110. The recommended content items are one or more of the content items retrieved from the repository 110. The server computer 104 is represented in FIG. 1 as a single entity, but can include multiple different servers in communication directly with one another, and/or over the network 102.

A user device 108 is an electronic device capable of requesting and receiving content items over the network 102. Example user devices 108 include personal computers, mobile communication devices, and other devices that can send and receive data over the network 102. A user device 108 typically includes a user application 112, such as a web browser or native application, to facilitate the sending and receiving of data in an application environment 114 (e.g., a graphical user interface), including submitting content requests and receiving content items (e.g., movies, television shows, music, e-books, streaming content, or other media content) over the network 102. The web browser can enable a user to display and interact with text, images, videos, music, and other information typically located on a web page at a website on the world wide web, or a LAN.

The user application 112 can include a dialog process 116 displayed in an active window of the application environment 114, for example, a chatbot or another virtual agent, to provide an interactive content selection experience to a user on the user device 108. Dialog process 116 can be executed on the user device 108, or can be provided to the user device 108 by the server 104 through the network 102. The dialog process 116 can utilize the content recommendation platform 122 (and the one or more content recommendation models 106) to select a content item 110 for presentation in the application environment 114 on the user device 108.

A group request (i.e., request for content recommendation for a group of users) can be submitted to the content recommendation platform 122 through the user application 112. A group request can be submitted by one or more users of the group, or by a third-party user. In some examples, a primary user can be responsible for submitting the request, and providing feedback for the group (e.g., as one entity). For example, a parent can use the platform to submit a request for a movie for a family. The parent can be a member of the group (e.g., a family movie night), or can be a third-party who requests content recommendations from the platform for the group (e.g., a movie night for children, and the children's friends). The group of users may consume a recommended content item on one device (e.g., streaming a movie on a TV), or on multiple devices that are connected over the network 102 (e.g., a video game being played by a group of friends).

In some implementations, the content recommendation platform can detect a group request based on input from one or more users of the group. For example, the user who submits the request into the platform may indicate that other users have joined for the request. As another example, a first user (e.g., a parent) may have let the platform know that at particular time or place the first user will be with a second user (e.g., a child).

The detection of a group request can be done by machine learning techniques, as well. For example, the content recommendation platform may determine that a first user has been repeatedly submitting a group request with a second user at particular time (e.g., every Saturday night), or particular place (e.g., at school). Accordingly, the platform can associate the first user with the second user when either of the first and the second users submits a request at the particular time or place.

In some examples, the content recommendation models 106 are used to determine, and recommend one or more content items to the group of users. In general, a content recommendation model 106 recommends content items based on a consumption pattern of each user of the group of users. A consumption pattern can be representative of a history of the user's interaction with the content recommendation platform 122 (e.g., through the application 112). For example, the recommendation model 106 may associate a user with horror movies when the user watches horror movies on a regular basis (e.g., three nights a week). In some examples, when a user provides feedback for a content item, the content recommendation model 106 can record the feedback in the consumption pattern of the user (e.g., in the feedback items repository 118). Each user feedback can be related to a feedback criteria. Example feedback criteria can include, without limitation, favorites, temporal consumption pattern, preferences, social media activities, calendar, and demographics. It is contemplated that, in addition to or instead of a user consumption pattern, the recommendation model 106 can use other sources, such as social media activity, demographics, feedback (explicit or implicit), temporal preferences, and favorites, for determining the content items to be recommended.

In some implementations, a consumption pattern can be determined based on explicit user feedback (e.g., the user submits a like), implicit user feedback (e.g., the system tracks the user's watch pattern and determines that the user likes a particular genre), or a combination of explicit and implicit feedback. In some implementations, the explicit feedback has a first weight, and the implicit feedbacks have a second weight (different from the first weight) in determining the consumption pattern of a user. In some examples, the weights can dynamically change. For example, a user watching romance movies three nights in a row can provide an implicit feedback with a weight indicating that the user prefers romance movies. The weight of this feedback can increase, if the user continues to watch romance movies, or decrease, if the user begins watching another genre more prevalently than romance movies.

In some implementations, a consumption pattern of a user can be used to determine content scores for the user. In accordance with implementations of the present disclosure, a PSM is used to determine content scores of each content item for a respective user. In some implementations, the PSM uses one or more content attributes for determining the content scores. In some examples, for each content item, the PSM determines the content attributes associated with the content item, and provides a content score for the content item and the user.

For example, for a content item that is a movie, the PSM may process genre, cast and crew, and language as content attributes. The PSM reviews a user's consumption patterns to determine a content score for the content item and the user. For instance, if the user has liked two romance movies and one Tom Hanks movie, a romance movie that stars Tom Hanks, the PSM may provide a content score of a first value (e.g., 3) for the content item, user tuple. As another example, if the user has previously disliked a movie directed by Tom Vaughan, and the content item is a romance movie that stars Tom Hanks and is directed by Tom Vaughan, the PSM may provide a content score of a second value (e.g., 2) for the content item, user tuple. Accordingly, the PSM determines one content score per user and per content item.

A content attribute can be common among several content types, or can be specific to a content type. For example, a content attribute of "drama" can be common between a book content type and a movie content type, and the content attribute "Tom Hanks" can be specific to a movie content type.

Example content attributes for a movie or television program content types can include, without limitation, title, actor(s), director, run time, genre, year, and character(s). Example content attributes for a music content type include, without limitation, musician(s), band name, genre, year, title, and track title(s). Example content attributes for a virtual game content type can include, without limitation, title, character, speed, ability to maneuver, and strength of a virtual character. Example content attributes for a virtual tour of a theme park content type can include, without limitation, location, number of rides, and type of rides included in the park. Example content attributes for booking a trip as a content type can include, without limitation, weather, location, and available activities at the destination. Example content attributes for a shopping content type can include, without limitation, merchants, price range, color, designer, and age. In some examples, content attributes for a content item can be defined by a provider (e.g., a distributor) of the content item, and/or can be defined by users through providing user feedback.

In some examples, multiple content attributes can have the same weight in a content score, or can have different weights. For example, a favorite actor can have a first weight and a genre can have a second weight. The first weight can be greater than the second weight. In some examples, multiple feedback criteria can have the same or different weights. For example, social media criteria (e.g., following or liking an actor) can have a greater weight than preferences (e.g., genre).

In some implementations, a content attribute can have a weight specific to a user. For example, a weight can be provided for a content attribute based on the prior reactions of the user to that content attribute. For instance, assume Tom Hanks movies have been offered to a user on 20 occasions, and Christopher Nolan movies have been offered to the user in 15 occasions. If the user has selected the Tom Hanks movies only 10 out of the 20 occasions, and the Christopher Nolan movies 15 out of the 15 occasions, a greater weight may be assigned for Christopher Nolan than for Tom Hanks for the particular user.

In some implementations, the PSM can dynamically update the content scores. For example, the PSM updates the content scores for a user after each interaction of the user with the content recommendation platform 122 (e.g., through the application 112), and/or upon receiving each feedback from the user (e.g., though social media in connection with the platform). In some examples, content scores in content types that share one or more content attributes are updated after receiving feedback (implicit or explicit) in one of the content types. For example, if a user provides a like feedback for romance content attribute for a movie, the content scores in both book and movie content types are updated. In some examples, only content scores within the content type for which the feedback is provided, are updated.

In some implementations, each time a user provides a feedback, the PSM updates the content scores associated with that feedback regardless of whether the feedback is repeated. In some examples, feedback can be considered as repeat feedback, if the feedback had been previously provided for the same content attribute in the same content type. For example, each time a user likes a romance movie the PSM adds a score to the content score of every romance movie for the user. In some implementations, the PSM only updates the feedback that are new and are not duplicative of prior feedback. For example, if a user had previously liked a first Tom Cruise movie, when the user provides a like feedback for a second Tom Cruise movie, the PSM detects a duplication and makes no changes to the content score of other Tom Cruise movies for the user. However, if the user provides a dislike for a third Tom Cruise movie, the PSM may detect the feedback as a new feedback and updates the content scores of Tom Cruise movies for this user.

In accordance with implementations of the present disclosure, one or more candidate content items are determined for recommendation to the group based on the content score of each content item with respect to each user of the group of users. In some implementations, the candidate content items are determined based on a combined score deviation of the content scores. For example, one or more content items with the lowest combined score deviation can be determined as candidate content items. In some examples, a combined score for a content item is provided as the standard deviation of the content scores of the content item. In some examples, a combined score for a content item is provided as the difference between the minimum content score and the maximum content score of the content item.

For example, a group of users including User 1, User 2, and User 3 request a movie (as digital content) from the content recommendation platform 122. The platform has access to the movies Inception and Interstellar (e.g., through connection with the repository 110), among many others. The content recommendation platform 122 provides content scores for each user and each content item (e.g., a user, content item tuple). Example content scores for User 1, User 2, User 3, and each of the movies are provided in the tables below:

| INCEPTION | | |
|---|---|---|
| User | Content Score | Content Criteria and Attribute |
| User 1 | 20 | Favorites: Actor - Tom Hardy |
| | | Following: Facebook - Christopher Nolan |
| User 2 | 10 | Favorites: Actor - Leonardo DiCaprio |
| User 3 | 5 | Preferences: Genre - Criminal |

| INTERSTELLAR | | |
|---|---|---|
| User | Content Score | Content Criteria and Attribute |
| User 1 | 70 | Following: Facebook - Michael Caine, Christopher Nolan |
| | | Favorite: Actor - Michael Caine |
| | | Prefers: Genre - Sci-Fi |
| | | Prefers: Release Year - Post 2010 |
| User 2 | 10 | Favorite: Actor - Michael Caine |
| User 3 | 5 | Prefers: Genre - Sci-Fi |

In this example, combined scores can be determined for Inception, and Interstellar, respectively. For example, a combined score deviation for Inception can be provided as 15 (e.g., the difference between the highest content score, and the lowest content score), and a combined content score deviation for Interstellar can be provided as 65 (e.g., the difference between the highest content score, and the lowest content score). Consequently, the combined score deviation of content scores for User 1, 2, and 3 is lower for Inception than for Interstellar, and, between these examples, Inception is provided as the candidate content item to the group of User 1, User 2, and User 3, and/or is provided as a more highly ranked candidate content item than Interstellar.

In some implementations, one or more personas for each user in the group of users can be provided. In some examples, a persona of a user is provided based on a history of the user's interaction with the content recommendation platform 122, or with other systems with which the platform is in communication (for example, other social media such as FACEBOOK). For example, a persona of a user can include the content attributes for which the user has provided feedback (e.g., liked). In some examples, personas of a user can include a social persona that is based on things that the user has shared publicly, a combined persona that is based on things that the user has shared with a sub-set of friends, and a private persona that is based on things that the user has not shared with anybody and kept as private In some examples, the content recommendation model can include an overview of a user's profile information in the persona. For example, based on the user's profile information, the model may use machine learning techniques to determine that the user will likely have positive or negative views with respect to particular attributes or content items. For instance, the model may determine that teenage girls typically like Justin Bieber; thus, the system includes Justin Bieber as a possible favorite singer in a persona for a user whose profile has been set up as a teenage girl. The model can have default settings for persona determinations, or can be set up by one or more users (for example, parents setting up a persona for their child) to consider particular attributes for generating a persona.

In some examples, the persona of a user can change dynamically as the user consumes content items, and/or provides feedback. For example, a persona can be updated based on updates on content scores made by the PSM for a respective user.

In some implementations, the content recommendation model creates a combined persona for the group of users (for whom the content is to be recommended). A combined persona can be created based on the persona of each user in the group. In some examples, a combined persona includes a list of the content items along with a combined persona score for each of the content items. The combined persona score for a content item can be the combined score deviation of the content item. For example, the combined persona for Users 1, 2, and 3 in the above example, can include Inception and Interstellar with combined persona deviation scores of 15 and 65, respectively.

In some implementations, to determine one or more candidate content items, the content recommendation model may filter a plurality of content items based on one or more consumption patterns. For example, the model may provide candidate content items that have the lowest combined score among a plurality of content items. For example, candidate content items can include content items having combined scores below a threshold score to provide a list of the top X (e.g., top 7) candidate content items. Applying one or more consumption patterns, one or more candidate content items can be removed, irrespective of their combined scores. For example, and continuing with the example above, although Inception has a higher combined score than Interstellar, Inception can be removed as a recommended content item, if a consumption pattern indicates that one or more users dislike Tom Hardy as an actor.

In some implementations, the consumption pattern is influenced based on one or more weights associated with one or more users in the group of users. For example, when a first user in the group of users is associated with a first weight, content attributes in the consumption pattern (including feedback) of the first user have the first weight in determining the strength of the consumption pattern for the group. For instance, a parent of a family may be associated with a weight of 10 and a child may be associated with a weight of 1. Accordingly, a particular genre (e.g., history) that the parent follows can be more influential in applying the consumption pattern (for the parent and the child) than a genre (e.g., fiction) that the child follows.

In some implementations, the consumption pattern includes a history of extreme reactions of one or more users of the group of users. Examples of extreme reactions can include, without limitation, absolute dislike of an attribute (e.g., an actor, as in the above Tom Hardy example), blocking an attribute by a user (e.g., a parent has blocked horror movies for children), and repetitive rejection (e.g., more than five times) of a recommended content item by a user. For example, if one of the users of the group of users has been previously offered (i.e., recommended) Interstellar three times, and the user has declined the offer all three times, application of a consumption pattern filters Interstellar from possible content items (or from candidate content items) to be recommended. In some implementations, the model reduces the priority of content item (e.g., Interstellar), or the content attribute (e.g., the actor) to which the one or more users have provided extreme reaction(s) based on consumption pattern. For example, and continuing with the above-provided example, User 3 may have provided an extreme reaction to Interstellar (e.g., rejected it five times). In this example, even though Interstellar has a lower score deviation than Inception, Interstellar may be given a lower priority for recommendation to the group of Users 1, 2, and 3 than Inception.

As described herein, in some cases, a user may have a different interest as an individual compared to when the user is in a group. Accordingly, the content recommendation platform of the present disclosure can consider a joint consumption pattern of two or more users in the group in determining one or more content items for recommendation to the group. For example, User 1 and User 2 may have a history of joint consumption of content on the content recommendation platform 122 (or on other systems in communication with the platform), such as planning a trip to Hawaii together. When Users 1 and 2 are among the group of users, for whom the content is to be recommended, the joint history of Users 1 and 2 can be used to filter the content items to what both Users 1 and 2 have previously shown interest in, or consumed. For example, in response to a request for a documentary movie, documentaries about Hawaii's nature, and/or Hawaii's history can be provided as candidate content items.

In some examples, a combined persona is provided for the group of users, and one or more content items can be filtered from recommendation based on the information of the combined persona. For example, if User 1 and User 2 have watched ten romance movies together (and only one horror movie together), a combined persona for Users 1 and 2 may include romance (and not horror) as a preference even if each one of Users 1 and 2 have not set up romance as their individual preferences. In some implementations, a combined persona is determined based on a user's (explicit or implicit) feedback or preferences regarding joint consumption of content items with other particular users. For example, User 1 may explicitly provide a preference for watching romance movies when User 1 is with User 2.

In some examples, repetitive patterns within a joint consumption pattern can affect the combined persona. In some examples, the joint consumption has to have been repeated for more than a threshold number of times (for example five times) to affect the combined persona. In some examples, the joint consumption has to have happened within a period of time (for example, within the last three months or five times within a week) to affect the combined persona; otherwise, it is considered a too remote or too old data to make any changes on the content recommendations.

In some implementations, the content recommendation model assigns a combined persona score per content item for each persona of a group of users. Continuing with the above example including the movies Inception and Interstellar, if there is a first combined persona for Users 1 and 2, and a second combined persona for Users 1 and 3, each of the first combined persona and the second combined persona will have a combined persona score for Inception and Interstellar movies (as two content items). The combined persona scores can be determined by applying the PSM on the history of joined consumption among the members of the group of users.

In some implementations, the content recommendation model filters the content items based on the combined persona scores associated with the users in the group of users. For example, the model filters out the content items with the lowest combined persona score and keeps the content items with the higher combined persona score (e.g., keeps the content items with the top ten greatest combined persona scores). The filter can be applied based on a threshold value of combined persona score. The threshold value can be a default value set in the model or can be set by one or more users in the group. The threshold value can also vary based on the profile information of the users. For example, when a parent and child are in the group, the threshold value may be set to a lower value than when the group consists of only friends.

In some implementations, the content recommendation model checks for the personas of the users of the group of users before looking at each member's individual content scores (or individual personas), or before checking the combined persona of the group. In such implementations, the candidate content items are selected from the content items that have the greatest combined persona scores. In some implementations, the content recommendation model checks for combined personas of the users of the group of users during or after determining the combined score of a content item. For example, the content recommendation model determines ten content items with the lowest combined scores, and checks the combined personas to filter down the ten content items to three content items with the greatest combined persona scores.

In some implementations, the combined persona of a group of users can be determined based on one or more personas of two or more users of the group in addition to the persona of each user of the group. In some examples, one or more persona scores associated with each content item can be included in calculating the combined score for each content item. For example, in the example described above, if Users 1 and 2 have a first combined persona for Interstellar, and Users 1 and 3 have a second combined persona for Interstellar, the combined score for Interstellar can be determined based on the content scores of each of Users 1, 2, and 3, the first combined persona score, and the second combined persona score.

User feedback items can include structured and/or unstructured user feedback data, where each item of user feedback data is provided by a user from a set of multiple users on user devices 108 in response to content items. Unstructured user feedback data includes freeform responses by users in response to content item recommendations and/or presentation, a user input responsive to a query from a dialog process, and/or a combination thereof. In some implementations, unstructured feedback can include an "emoji" that carries the sentiment expressed by the user. An example of unstructured user feedback includes a user response "The Godfather is not a funny movie" in response to a recommended content item as the movie "The Godfather." Structured user feedback includes user selections and/or rejections responsive recommended content items, user partial or complete viewings of recommended content items, or other forms of direct feedback to the model regarding user preferences and/or selections of content items. Structured user feedback can include a "star rating system" in which users can rate a recommendation using a quantified value (e.g., 1-5 stars or the like). An example of a structured user feedback includes a user selection of the movie "Midnight in Paris" when presented with a selection of comedic films in response to requesting presentation of a romantic comedy.

In some implementations, user feedback items can be received by the content recommendation model through interactions of a user with the user's social network. In an example, a user may react (e.g., "like") or comment in response to a post by another user in the user's social network regarding a content item (e.g., Mike is watching "The Terminator"). In another example, a user may react to a post by another user in the user's social network that references a content item, for example, a press release about a movie or television show. A user may also post or interact with posts on their own social media page that display information regarding content items, for example, posting a press release about an upcoming film or an opinion editorial or media clip referencing a content item.

In some implementations, implicit feedback of a user is received by the content recommendation model 106 through various interactions of other users in the user's social network with content items. For example, another user in the user's social network posts a review of a movie or television, or a post referencing a viewing of a movie or television show. The content recommendation model 106 can weigh feedback items from a particular user in the user's social network based in part on the particular user's level of influence on the user. The level of influence can be determined, for example, based on an amount of interaction between the particular user and the user, an amount of expertise the particular user has regarding the content item (e.g., works in the movie industry), and/or a number of propagations of the user feedback item by other users in the particular user's social network. Additionally, feedback items from other users in the user's social network with whom the user has overlapping age group, gender, life style, and sentiments can influence a content scores of the user.

In situations in which the systems discussed here collect personal information about users, or makes use of personal information, the users may be provided with an opportunity to control what user information (e.g., information about a user's social network, social actions or activities, profession, a user's preferences, or a user's current location) may be collected, or to control whether and/or how to receive content that may be more relevant to the user. In addition, certain data may be treated in one or more ways before it is stored or used, so that personally identifiable information is removed. For example, a user's identity may be treated so that no personally identifiable information can be determined, or a user's geographic location may be generalized so that a particular location of a user cannot be determined. Thus, the user may have control over how information about the user is collected and used by a content server (e.g., the server 104).

In some implementations, a semantic interpretation module 120 performs semantic interpretation on a user request for content presentation. The user request can be input into the dialog process 116, and the semantic interpretation module 120 can receive one or more requests (e.g., text input string and/or voice command) and perform analysis to determine a user intent. For example, a user request can be "We want to watch something funny," where the semantic interpretation module 120 may determine a user intent (group intent) from the input text string to be a request for a comedic content item (e.g., a comedy movie or comedy television program). The semantic interpretation module 120 can also receive a request for content presentation in the form of an ambiguous request, for example a user input query "We are bored," and determine a user intent requesting content presentation. The semantic interpretation module 120 can provide the semantic interpretation and resulting user intent to the content recommendation model 106 such that the content recommendation model 106 can determine a content item to provide to the user device 108 for presentation.

In some implementations, semantic interpretation can be done based on domain rules or using Latent Semantic processes, for example, using themes. For example, a rule-based approach includes analyzing user-provided statement including one or more sentiments and/or emotions (e.g., "We are bored"). The statement is analyzed using a sentiment analysis method or an emotion analysis method, for example, by using emotive or affective vocabulary. The content recommendation model is designed to reverse or enhance the polarity of the user-provided statement, depending in part on a degree of negativity or a degree of positivity of the statement, respectively. The user-provided statement can then be mapped to a corresponding theme on which content items are clustered. The user-provided statement "We are bored," for example, lends to an affective category of "disgust" or "sadness." The detected polarity is reversed and the content recommendation model searches for a cluster of content items which have an opposing theme, for example, "joyful," "happy," "pleasurable," or the like. If the user-provided statement is "We are feeling excited," the emotion detected can be determined to be positive. The positive emotion is reinforced in the search criteria, and themes such as "exciting" or "exhilarating" in the movies are searched. Type mining to determine a latent type of a set of content items (e.g., movies) can be done using, for example, a combined corpus of the movie plots, expert comments, and unstructured user feedback. In one implementation, this is done using a Latest Semantic Indexing technique, where a type vector index may contain sentiment or emotion bearing words (like "satisfying," "moving," "joyous," etc.) and these terms can be used to identify the relevant movie clusters for a recommendation purpose.

In some implementations, each content recommendation model 106 is trained for a particular user on a user device 108, for a particular user on multiple user devices 108 through a single login, and/or for a particular user device 108 that can include multiple users.

In some implementations, a content recommendation model 106 is trained using temporal data, such that recommendations for content items provided to the user of the user device 108 can vary based in part on a time of day and/or day of the week. For example, content recommendation can depend on whether the content is requested in an evening.

Figure 2A:
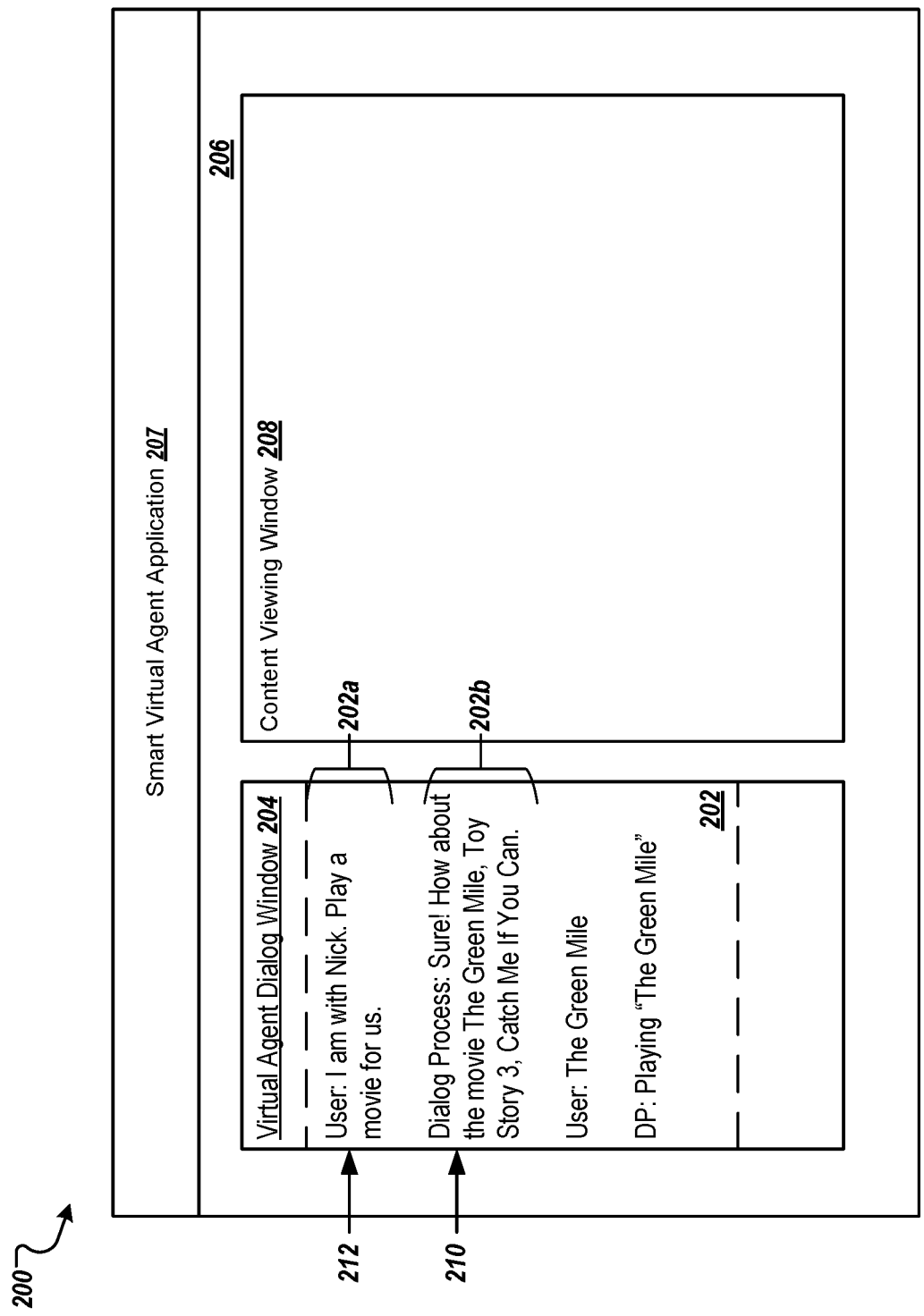
FIGS. 2A-2B schematically depict example dialog processes in a virtual agent dialog window in an application environment.
Figure 2B:
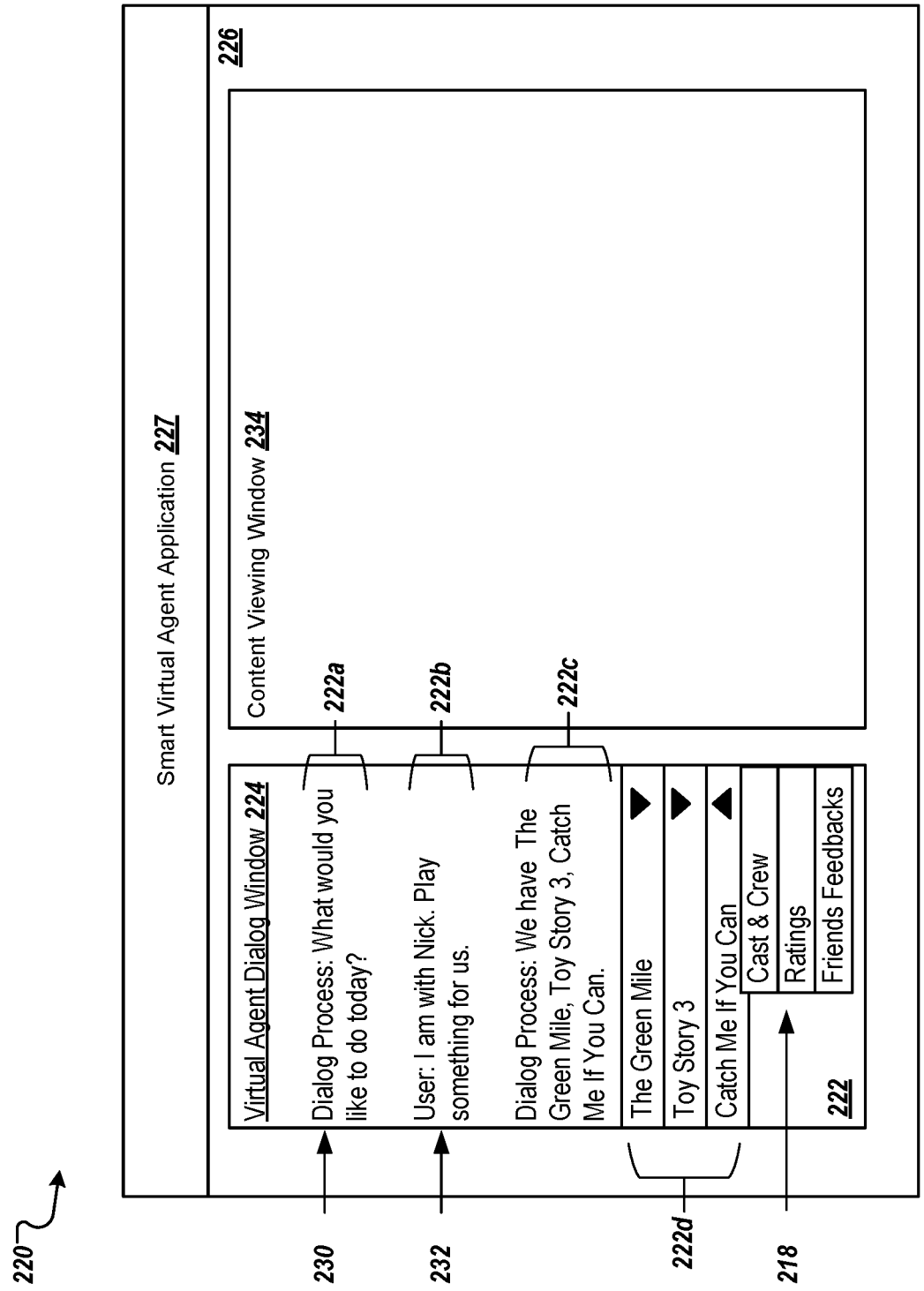

FIGS. 2A-2B schematically depict example dialog processes in a virtual agent dialog window in an application environment.

FIG. 2A schematically depicts an example dialog process interaction 202 in a virtual agent dialog window 204 in an application environment 206 of a smart virtual agent application 207. The smart virtual agent application can execute locally on a user device (e.g., application 112 on user device 108), and/or can be located at a server (e.g., server 104) and be accessed by a user device 108 over the network 102.

The application environment 206 can include a content viewing window 208 where a content item (e.g., a movie) can be displayed. A dialog process interaction 202 in the application environment 206 is a natural-language conversation between a user and the smart virtual agent application 207 using data provided by a content recommendation model (e.g., content recommendation model 106) over a network 102. The dialog process interaction 202 in the virtual agent dialog window 204 can include a series of one or more queries and responses between a dialog process 210 (e.g., a content recommendation model 106 on a server 104) and the user 212 (e.g., a user on a user device 108).

In some implementations, a dialog process interaction 202 is initiated in the virtual agent dialog window 204 by an initial query 202a by a user 212 (e.g., a request for presentation of a content item), and is followed by a request for input 202b responsive to the initial user query by the dialog process 210 (e.g., a clarifying question responsive to the initial request for presentation of a content item). For example, a user 212 inputs "I am with Nick. Play a movie for us." in the form of a text string input and/or a voice command, and the dialog process 210 responds with "Sure! How about the movie The Green Mile, Toy Story 3, Catch Me If You Can?" In some implementations, the user input is a single criterion, such that one descriptive term (e.g., an attribute value such as an actor's name) is defined in the query.

The dialog process interaction 202 proceeds until the content recommendation model 106 selects one or more content items as suggested content items for presentation to the user 212. The one or more content items presented to the user 212 as suggested content items can be selected by the user 212 for presentation in the content viewing window 208. For example, the selected content item (e.g., the movie "The Green Mile") can be displayed in the content viewing window 208. In some implementations, the virtual agent dialog window 204 is inactive (e.g., hidden from the active window and/or minimized) during the viewing of content in the content viewing window 208.

In some implementations, a dialog process is initiated in the virtual agent dialog window by a user initiating an active window of the smart entertainment virtual agent application and/or the virtual agent dialog window. FIG. 2B schematically depicts another example dialog process interaction 222 in a virtual agent dialog window 224 in an application environment 226 of a smart virtual agent application 227. Dialog process interaction 222 in the virtual agent dialog window 224 is initiated by a dialog process 230 prompting a user 232 for an input 222a, e.g., "What would you like to do today?" The prompt from the dialog process 230 can be initiated by a user 232 initiating an instantiation of the virtual agent dialog window 224 within the smart virtual agent application 227, and/or by initiating the smart entertainment virtual agent application 227 (e.g., opening the application) where the virtual agent dialog window 224 automatically launches and prompts the user for input. The dialog process interaction 222 proceeds between the dialog process 230 and the user 232 until a content item is suggested by the content recommendation model 106 and selected for presentation in the content viewing window 234 by the user 232.

In some implementations, the content recommendation model 230 presents a set of criterions along with suggesting the content items to the user 232. In the depicted example of FIG. 2B, the suggested content items are presented in a list 222c as well as in a drop down menu 222d. User 232 can click on any of the suggested content items in the drop down menu to view the set of criterions 218. The criterions of the set of criterions 218 can be set up by the user 230 or can be set as default items by the content recommendation platform 122 (or content recommendation model 106). A criterion can include one or more content attributes.

The criterion can be specific to the user 230 or independent of the user 230. For example, the Cast & Crew criterion can be independent of the user and be shown to every user requesting a movie content, while the Friends Feedbacks can be specific to the user who has submitted a content request. The Friends Feedbacks can include feedbacks of the user's friends in the content recommendation platform, or the user's friends in other social media (e.g., FACEBOOK, TWEETER, etc.). The Friends Feedbacks can include feedbacks on content attributes with respect to the content item, or feedbacks on one or more content attributes in general.

For example, a feedback can be on an actor's performance in a particular movie (e.g., Tom Hanks' performance in Catch Me If You Can), or on the actor's performance in general (e.g., Tom Hanks is a great actor).

In some implementations, a user input 222b includes multiple criteria. For example, a user 230 can specify two criteria in which a requested content item includes "an action film" and a director "Steven Spielberg." Additionally, one or more of the multiple criteria can be descriptive or a characteristic of the content item (e.g., "action" film).

In some implementations, a user input 222b is an opened-ended (e.g., ambiguous or incomplete) request by the user 230 for presentation of a content item. For example "Play something," where the user is requesting a content item and a recommendation from the dialog process 230 for what content item to view. The dialog process 230 can then provide one or more recommended content items based in part on the content recommendation model 106 for the user 230. For example, if the content recommendation model 106 for user 230 determines that the user 230 has previously provided positive user feedback and/or selected to view films starring Robert DeNiro in action films, it may recommend similar actors who also star in action films.

In some implementations, multiple dialog templates can be used to provide a natural-language interaction between the dialog process (e.g., virtual agent dialog process interaction 202) and the user 212. A dialog template may be applied to a user input, for example, determining that a user input "Play a comedy movie" is intending "Play a <genre> movie." A dialog template can be applied to a dialog process response, for example, "Would you like to see a comedy starring <actor 1>, <actor 2>, or <actor 3>" where each <actor 1>, <actor 2>, and <actor 3> are filled in by the content recommendation model as suggested actors for the user responsive to the request for content presentation.

Though the application environment depicted in FIGS. 2A-2B shows a dialog process and content viewing window in relative locations within the active window of the application environment, other configurations are imaginable (e.g., separate windows displaying a dialog process and the content viewing window and/or a dialog process that is not visually displayed but is voice-activated).

Figure 3:
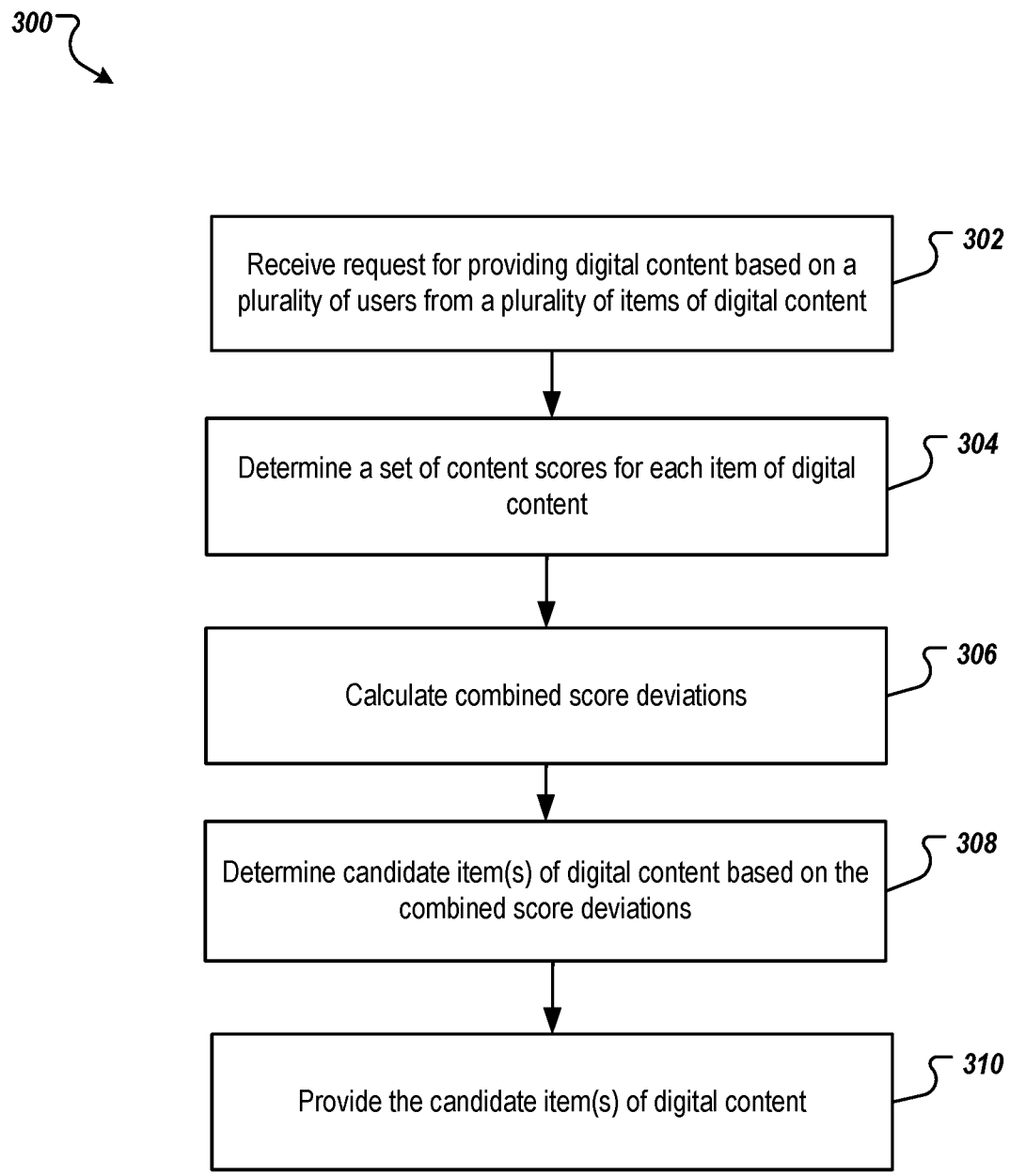
FIGS. 3 and 4 are flowcharts of example processes for content recommendation in accordance with implementations of the present disclosure.

FIG. 3 is a flowchart of an example process 300 for content recommendation that can be executed in accordance with implementations of the present disclosure. In some implementations, the example process 300 may be performed using one or more computer-executable programs executed using one or more computing devices.

A request for providing digital content based on a plurality of users is received (302). The request is for a group of users (i.e. is a group request), and the content is to be recommended from a plurality of items of digital content (e.g., from the repository 110). The request may be input into a dialog process 116 in an application environment (e.g., application environment 114, 206) on a user device 108. The request is submitted to a content recommendation platform 122 (or the content recommendation model 106).

A set of content scores for each item of digital content is determined (304). For example, the content scores can be determined by the content recommendation model 106 (or a PSM) for each item of digital content that the recommendation content platform 122 can access, and for each user with respect to each item of digital content. In some examples, content scores are determined for only items of digital content that have the same content type as the requested content (e.g., only for movie content items, as opposed to for content items in every content theme).

Combined score deviations are determined (306). For each item of digital content that has a set of content scores, a combined score deviation is determined. Using the example above, the content recommendation model determines combined score deviations for each of Inception and Interstellar, as respective items of digital content. In some examples, a combined score deviation of an item of digital content is determined as the difference between the maximum content score, and the minimum content score of the item of digital content.

Candidate item(s) of digital content are determined based on the combined score deviations (308). For example, five items that have the lowest combined score deviations among the items of digital content (e.g., content items 110) are determined as the candidate items.

The candidate item(s) of digital content are provided (310). For example, the content recommendation model provides the candidate items to the user device 108, or to the application 112 through the application environment 114. For example, and referencing FIG. 2B, the candidate items can be recommended as the list 222c, or the drop down menu 222d for user selection.

Figure 4:
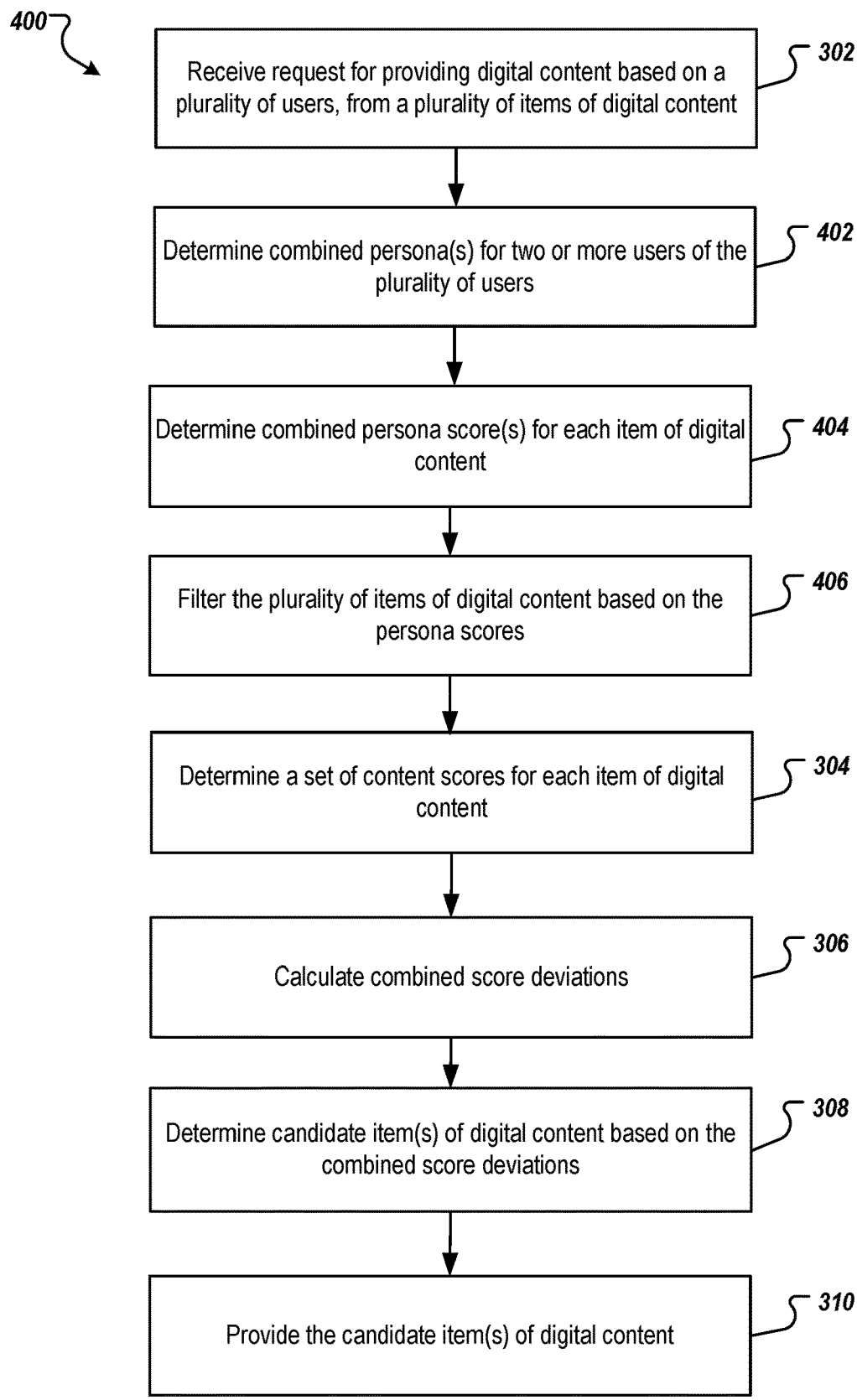

As described herein, in some implementations, one or more personas associated with the users of the group of users (for whom the content is to be recommended) affect the determination of the candidate items of digital content. FIG. 4 is a flowchart of an example process 400 for content recommendation that can be executed in accordance with implementations of the present disclosure. In some implementations, the example process 400 may be performed using one or more computer-executable programs executed using one or more computing devices.

The process 400 in part shares portions of the process 300. For example, similar to process 300, in process 400 a request for providing digital content based on a plurality of users (i.e., a group-request) is received (302), a set of content scores are determined (304), combined score deviations are determined (306), candidate items of digital content are determined (308), and the candidate items of digital contents are provided (310). In addition to these actions, FIG. 4 includes determining personas and filtering the items of digital content based on the personas.

Persona(s) for two or more users of the plurality of users is determined (402). For example, the content recommendation model 106 determines that two or more users of the plurality of users have a history of requesting and/or consuming digital contents together. A persona for a two or more users can include one or more items of digital content or content attributes that are indicative of the consumption pattern and feedbacks of the two or more users as a group.

A combined persona score for each item of digital content is determined (404). For example, the combined persona score can be determined similar to determining a content score (304). For each item of digital content (or alternatively, each item within the same content theme) the combined persona score is determined based on joint content consumption of the two or more users (for whom the combined persona is determined).

The plurality of items of digital content is filtered based on the combined persona score deviation. For example, one or more items with the greatest combined persona scores are kept and the rest of the items are filtered out. For instance, the items with the top ten combined persona scores can be kept.

The filtration based on the combined persona can be performed before, after, or during determination of the set of content scores (302), and/or calculation of combined scores (304). Thus, the candidate items of digital contents can be determined from the items of digital content with the greatest combined persona among the plurality of items of digital content.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing digital content based on a plurality of users, the method being executed by one or more processors and comprising:
   receiving a request for digital content to be provided from a plurality of items of digital content;
   determining a set of content scores for each item of digital content in the plurality of items of digital content, each content score in the set of content scores being specific to a user of the plurality of users, and a respective item of digital content;
   calculating a combined score deviation for each item of digital content based on a difference between a minimum content score and a maximum content score of the set of content scores of a respective item of digital content;
   determining a combined persona for two or more users of the plurality of users based on a history of items of digital content previously provided to the two or more users;
   determining a combined persona score deviation for each item of digital content of the plurality of items of digital content;
   filtering the plurality of items of digital content to provide one or more items of digital content that have a lowest combined persona score deviation among the plurality of items of digital content;
   determining at least one candidate item of digital content from the one or more items of digital content, the at least one candidate item of digital content having a lowest combined score deviation among combined score deviations of the the one or more items of digital content; and
   providing, by the one or more processors, the at least one candidate item of digital content.

2. The computer-implemented method of claim 1, wherein the combined persona includes at least one content attribute for which the two or more users have previously provided feedback.

3. The computer-implemented method of claim 1, wherein a content score specific to a user is determined based on a history of user consumption of items of digital content.

4. The computer-implemented method of claim 1, wherein a content score specific to a user is determined based on feedback that the user has provided.

5. The computer-implemented method of claim 4, wherein the feedback is associated with one or more content attributes.

6. The computer-implemented method of claim 4, wherein the feedback includes a first feedback and a second feedback, the first feedback having a first weight in the content score and the second feedback having a second weight in the content score, the second weight being different from the first weight.

7. The computer-implemented method of claim 1, further comprising:
   receiving, by the one or more processors, a selected candidate item of digital content that is selected from the at least one candidate item of digital content by a user of the plurality of users; and
   updating content scores of an item of digital content, wherein the item of digital content has at least one common content attribute with the selected candidate item of digital content.

8. The computer-implemented method of claim 1, wherein the plurality of items of digital content comprise movies.

9. One or more non-transitory computer-readable storage media coupled to one or more processors and having instructions stored thereon which, when executed by the one or more processors, cause the one or more processors to perform operations for providing digital content based on a plurality of users, the operations comprising:
   receiving a request for digital content to be provided from a plurality of items of digital content;
   determining a set of content scores for each item of digital content in the plurality of items of digital content, each content score in the set of content scores being specific to a user of the plurality of users, and a respective item of digital content;
   calculating a combined score deviation for each item of digital content based on a difference between a minimum content score and a maximum content score of the set of content scores of a respective item of digital content;
   determining a combined persona for two or more users of the plurality of users based on a history of items of digital content previously provided to the two or more users;
   determining a combined persona score deviation for each item of digital content of the plurality of items of digital content;
   filtering the plurality of items of digital content to provide one or more items of digital content that have a lowest combined persona score deviation among the plurality of items of digital content;
   determining at least one candidate item of digital content from the one or more items of digital content, the at least one candidate item of digital content having a lowest combined score deviation among combined score deviations of the the one or more items of digital content; and
   providing the at least one candidate item of digital content.

10. The computer-readable storage media of claim 9, wherein the combined persona includes at least one content attribute for which the two or more users have previously provided feedback.

11. The computer-readable storage media of claim 9, wherein a content score specific to a user is determined based on a history of user consumption of items of digital content.

12. The computer-readable storage media of claim 9, wherein a content score specific to a user is determined based on feedback that the user has provided.

13. The computer-readable storage media of claim 12, wherein the feedback includes a first feedback and a second feedback, the first feedback having a first weight in the content score and the second feedback having a second weight in the content score, the second weight being different from the first weight.

14. The computer-readable storage media of claim 9, wherein operations further comprise:
receiving a selected candidate item of digital content that is selected from the at least one candidate item of digital content by a user of the plurality of users; and
updating content scores of an item of digital content, wherein the item of digital content has at least one common content attribute with the selected candidate item of digital content.

15. The computer-readable storage media of claim 9, wherein the plurality of items of digital content comprise movies.

16. A system, comprising:
one or more processors; and
a computer-readable storage device coupled to the one or more processors and having instructions stored thereon which, when executed by the one or more processors, cause the one or more processors to perform operations for providing digital content based on a plurality of users, the operations comprising:
receiving a request for digital content to be provided from a plurality of items of digital content;
determining a set of content scores for each item of digital content in the plurality of items of digital content, each content score in the set of content scores being specific to a user of the plurality of users, and a respective item of digital content;
calculating a combined score deviation for each item of digital content based on a difference between a minimum content score and a maximum content score of the set of content scores of a respective item of digital content;
determining a combined persona for two or more users of the plurality of users based on a history of items of digital content previously provided to the two or more users;
determining a combined persona score deviation for each item of digital content of the plurality of items of digital content;
filtering the plurality of items of digital content to provide one or more items of digital content that have a lowest combined persona score deviation among the plurality of items of digital content;
determining at least one candidate item of digital content from the one or more items of digital content, the at least one candidate item of digital content having a lowest combined score deviation among combined score deviations of the the one or more items of digital content; and
providing the at least one candidate item of digital content.

17. The system of claim 16, wherein the combined persona includes at least one content attribute for which the two or more users have previously provided feedback.

* * * * *

UNITED STATES PATENT AND TRADEMARK OFFICE
CERTIFICATE OF CORRECTION

PATENT NO. : 10,866,982 B2  
APPLICATION NO. : 16/287149  
DATED : December 15, 2020  
INVENTOR(S) : Srikanth G. Rao et al.

Page 1 of 1

It is certified that error appears in the above-identified patent and that said Letters Patent is hereby corrected as shown below:

In the Claims

Column 19, Line 48, in Claim 1, delete "the the" and insert -- the --, therefor.

Column 20, Line 51, in Claim 9, delete "the the" and insert -- the --, therefor.

Column 22, Line 23, in Claim 16, delete "the the" and insert -- the --, therefor.

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*